United States Patent
Chen et al.

(10) Patent No.: US 11,790,320 B2
(45) Date of Patent: Oct. 17, 2023

(54) APPROACHES TO CREATING AND EVALUATING MULTIPLE CANDIDATE WELL PLANS

(71) Applicant: Schlumberger Technology Corporation, Sugar Land, TX (US)

(72) Inventors: Shaoyu Chen, Beijing (CN); Ping Lyu, Beijing (CN); Kevin Hermansen, Asker (NO); Qingrui Li, Beijing (CN); Diego Medina, Beijing (CN); Yingfei Hu, Beijing (CN); Petter Laurentius Eide, Asker (NO); Lucian Johnston, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 17/304,813

(22) Filed: Jun. 25, 2021

(65) Prior Publication Data
US 2021/0406833 A1  Dec. 30, 2021

Related U.S. Application Data

(60) Provisional application No. 62/705,408, filed on Jun. 25, 2020.

(51) Int. Cl.
*G06Q 10/10* (2023.01)
*G06Q 50/08* (2012.01)
(Continued)

(52) U.S. Cl.
CPC .......... *G06Q 10/103* (2013.01); *E21B 41/00* (2013.01); *G06Q 10/06313* (2013.01);
(Continued)

(58) Field of Classification Search
CPC .......... G06Q 10/103; G06Q 10/06313; G06Q 10/06375; G06Q 10/101; G06Q 30/018; G06Q 50/08; E21B 41/00
See application file for complete search history.

(56) References Cited

U.S. PATENT DOCUMENTS

| | | | | |
|---|---|---|---|---|
| 8,352,341 B1 * | 1/2013 | Greenberg | ..... | G06Q 10/063114 705/35 |
| 2005/0149307 A1 * | 7/2005 | Gurpinar | ................. | E21B 43/00 703/10 |

(Continued)

FOREIGN PATENT DOCUMENTS

CN    103946849 A  *  7/2014  .............  E21B 43/26

OTHER PUBLICATIONS

Okwiri "Risk Assessment and risk modelling in geothermal drilling" (2017) (https://orkustofnun.is/gogn/unu-gtp-report/UNU-GTP-2017-02.pdf) (Year: 2017).*

*Primary Examiner* — Sujay Koneru
(74) *Attorney, Agent, or Firm* — Jeffrey D. Frantz

(57) ABSTRACT

An improved approach to creating a plan for a well. A user receives an initial well plan for a planned well and uses the initial well plan as a starting point for alternate well plans. This is done by creating a copy of the initial well plan, allowing the various uses to make changes to the initial well plan, and executing various automatic validation routines on the alternate designs. These validation routines can provide estimated times and costs to complete the planned well use the alternate well plan. The approach can also involved displaying the estimated times and costs of the different candidate well plans. The user can then select one of the candidate well plans as the master well plan. As replanning is done during the operations, this replanning information, along with the actual executed actions, is captured and stored.

17 Claims, 16 Drawing Sheets

(51) Int. Cl.
*E21B 41/00* (2006.01)
*G06Q 10/0637* (2023.01)
*G06Q 10/0631* (2023.01)
*G06Q 10/101* (2023.01)
*G06Q 30/018* (2023.01)

(52) U.S. Cl.
CPC ..... *G06Q 10/06375* (2013.01); *G06Q 10/101* (2013.01); *G06Q 30/018* (2013.01); *G06Q 50/08* (2013.01)

(56) References Cited

U.S. PATENT DOCUMENTS

| | | | |
|---|---|---|---|
| 2006/0247903 A1* | 11/2006 | Schottle | E21B 49/00 703/10 |
| 2010/0314104 A1* | 12/2010 | Shokanov | E21B 47/10 166/250.1 |
| 2011/0251933 A1* | 10/2011 | Egnor | G06Q 50/06 703/2 |
| 2012/0188091 A1* | 7/2012 | Calleja | G01V 3/38 340/854.1 |
| 2014/0214387 A1* | 7/2014 | Tilke | E21B 43/305 703/10 |
| 2017/0140319 A1* | 5/2017 | Gottemukkala | G06F 3/04847 |
| 2018/0051552 A1* | 2/2018 | Li | E21B 47/024 |
| 2019/0227192 A1* | 7/2019 | Castagnoli | G01V 99/005 |
| 2021/0390478 A1* | 12/2021 | Krishnamoorthy | G06Q 10/06313 |
| 2021/0406833 A1* | 12/2021 | Chen | G06Q 10/101 |

\* cited by examiner

APPROACHES TO CREATING AND EVALUATING MULTIPLE CANDIDATE WELL PLANS

BACKGROUND

Unless otherwise indicated, this section does not describe prior art to the claims and is not admitted prior art.

Planning an activity in the energy industry can be a challenging and expensive exercise that requires input and decisions from various domain experts and businesspersons ("contributors"). For example, creating a plan to drill a well may require input from geologists, drilling fluid engineers, drilling engineers, and many others. Each individual contributor may be working on a particular piece of the plan; however, the decisions a contributor makes in their area of expertise can have an impact on other parts of the plan. For example, a change in the trajectory of a well may impact the choice of drilling fluid and the design of the bottom hole assembly ("BHA").

An improved approach to tracking and validating the decisions of contributors facilitates analysis of the outcomes of the actual execution of the plan. It may also allow for a more complete understanding of the impact of different decisions on the final plan. A team may also want to consider multiple possible approaches; when multiple candidate solutions can be considered, it can be challenging for teams to create and evaluate the relative merits and challenges of different approaches to the same planned well.

While the description below is directed to the creation of a well plan, the approaches described herein can be used in connection with other planning activity as well such as cementing operations, wireline or formation testing, or other plans for operational activities in the energy industry. Similarly, the approach may be used for a variety of wells, including wells for water and geothermal energy.

BRIEF SUMMARY

In one aspect, a computer-implemented method includes receiving an initial well plan for a planned well. The computer-implemented method also includes receiving a request from a user to create an alternate well plan for the planned well. The computer-implemented method also includes creating the alternate well plan by creating a copy of the initial well plan, and receiving a plurality of changes to the well plan. The computer-implemented method also includes executing a plurality of validation routines on the alternate well plan, the validation routines automatically calculating at least an estimated time to complete the planned well using the alternate well plan, an estimated cost to complete the planned well using the alternate well plan, displaying the estimated time and the estimated cost of the initial well plan and the alternate well plan, and receiving, from the user, a selection of one of the initial well plan and the alternate well plan as a master well plan to be used in drilling the planned well.

The computer-implemented method may also include further includes creating a plurality of alternate well plans, displaying the estimated time and the estimated cost for each of the plurality of alternate well plans, receiving, from the user, a selection of one of the initial well plan and the plurality of alternate well plans as the master well plan to be used in drilling the planned well.

The computer-implemented method may also include further includes determining a plurality of differences between the initial well plan and the alternate well plan, Displaying the plurality of differences to the user.

The computer-implemented method may also include further includes storing the selected well plan as the master well plan, and creating an editable operational plan from the master well plan for editing while drilling the planned well.

The computer-implemented method may also include further includes, during creation of the initial well plan for the planned well, creating a log of changes committed to the initial well plan by contributing authors to the initial well plan.

The computer-implemented method may also include the validation routines further automatically calculating one or more of an emissions footprint for the planned well using the alternate well plan, and a risk profile for the planned well using the alternate well plan. Other technical features may be readily apparent to one skilled in the art from the following figures, descriptions, and claims.

The computer-implemented method may also include further includes receiving, from the user a selection of one of the plurality of alternate well plans as a contingency well plan, and an identification of one or more events in response to which a team constructing the planned well will use the contingency well plan in drilling the planned well.

The computer-implemented method may also include further includes receiving, during construction of the planned well, rig sensor data and user-provided information describing activities during construction of the planned well as an executed well plan, associating the selected well plan, the editable operational plan, and the executed well plan, and storing the selected well plan, the editable operational plan, and the executed well plan.

The computer-implemented method may also include further includes, for one or more objects in the initial well plan, creating a log of changes to the one or more objects by multiple contributing authors, where the one or more objects comprise one or more of a wellbore, a mud program, and a bottom hole assembly. Other technical features may be readily apparent to one skilled in the art from the following figures, descriptions, and claims.

This summary introduces some of the concepts that are further described below in the detailed description. Other concepts and features are described below. The claims may include concepts in this summary or other parts of the description.

BRIEF DESCRIPTION OF THE DRAWINGS

To easily identify the discussion of any particular element or act, the most significant digit or digits in a reference number refer to the figure number in which that element is first introduced. The figures below are not necessarily to scale; dimensions may be altered to help clarify or emphasize certain features.

DETAILED DESCRIPTION

Introduction

Figure 1:
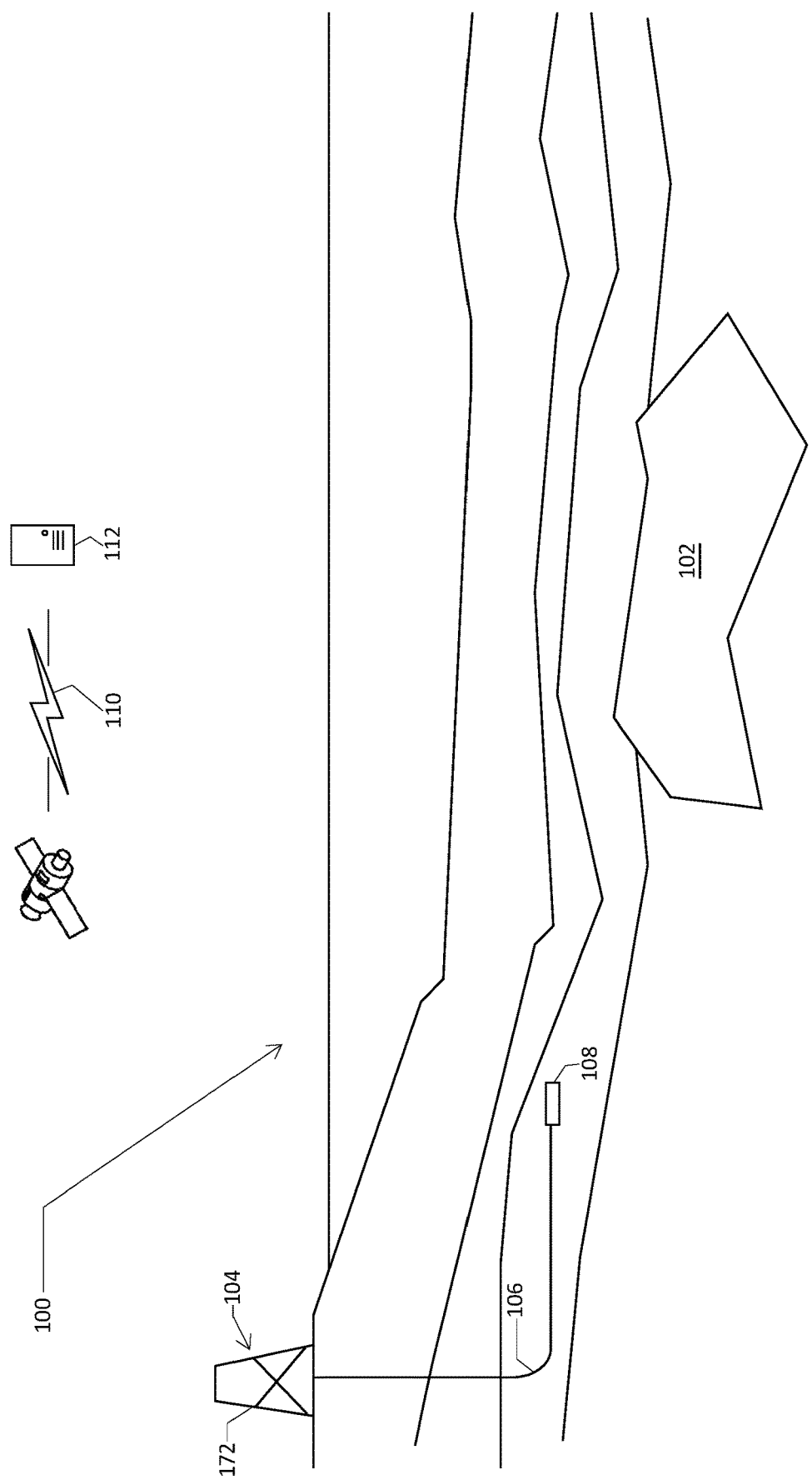
FIG. 1 illustrates an example of an environment in which drilling may take place.

The following detailed description refers to the accompanying drawings. Wherever convenient, the same reference numbers are used in the drawings and the following description to refer to the same or similar parts. While several embodiments and features of the present disclosure are described herein, modifications, adaptations, and other implementations are possible, without departing from the spirit and scope of the present disclosure.

Although the terms "first", "second", etc. may be used herein to describe various elements, these terms are used to distinguish one element from another. For example, a first object or step could be termed a second object or step, and, similarly, a second object or step could be termed a first object or step, without departing from the scope of the present disclosure. The first object or step, and the second object or step, are both, objects or steps, respectively, but they are not to be considered the same object or step.

The terminology used in the description herein is for the purpose of describing particular embodiments and is not intended to be limiting. As used in this description and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, as used herein, the term "if" may be construed to mean "when" or "upon" or "in response to determining" or "in response to detecting," depending on the context.

Embodiments

FIG. 1 illustrates one example of an environment 100 in which drilling may occur. The environment may include a reservoir 102 and various geological features, such as stratified layers. The geological aspects of the environment 100 may contain other features such as faults, basins, and others. The reservoir 102 may be located on land or offshore.

The environment 100 may be outfitted with sensors, detectors, actuators, etc. to be used in connection with the drilling process. FIG. 1 illustrates equipment 104 associated with a well 106 being constructed using downhole equipment 108. The downhole equipment 108 may be, for example, part of a bottom hole assembly (BHA). The BHA may be used to drill the well 106. The downhole equipment 108 may communicate information to the equipment 104 at the surface, and may receive instructions and information from the surface equipment 104 as well. The surface equipment 104 and the downhole equipment 108 may communicate using various communications techniques, such as mud-pulse telemetry, electromagnetic (EM) telemetry, or others depending on the equipment and technology in use for the drilling operation.

The surface equipment 104 may also include communications means to communicate over a network 110 to remote computing devices 112. For example, the surface equipment 104 may communicate data using a satellite network to computing devices 112 supporting a remote team monitoring and assisting in the creation of the well 106 and other wells in other locations. Depending on the communications infrastructure available at the wellsite, various communications equipment and techniques (cellular, satellite, wired Internet connection, etc.) may be used to communicate data from the surface equipment 104 to the remote computing devices 112. In some embodiments, the surface equipment 104 sends data from measurements taken at the surface and measurements taken downhole by the downhole equipment 108 to the remote computing devices 112.

During the well construction process, a variety of operations (such as cementing, wireline evaluation, testing, etc.) may also be conducted. In such embodiments, the data collected by tools and sensors and used for reasons such as reservoir characterization may also be collected and transmitted by the surface equipment 104.

In FIG. 1, the well 106 includes a substantially horizontal portion (e.g., lateral portion) that may intersect with one or more fractures. For example, a well in a shale formation may pass through natural fractures, artificial fractures (e.g., hydraulic fractures), or a combination thereof. Such a well may be constructed using directional drilling techniques as described herein. However, these same techniques may be used in connection with other types of directional wells (such as slant wells, S-shaped wells, deep inclined wells, and others) and are not limited to horizontal wells.

Figure 2:
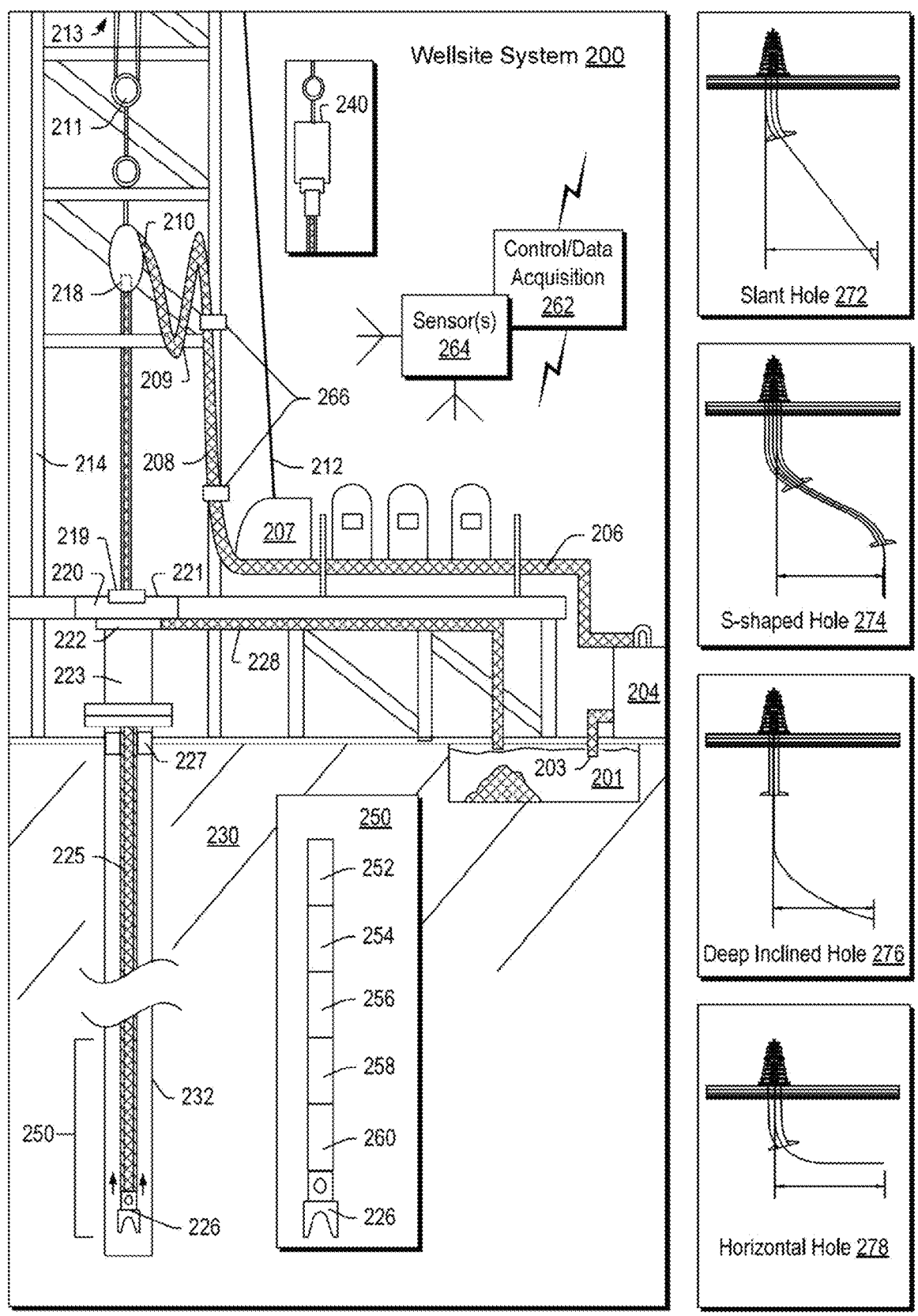
FIG. 2 illustrates an example of a drilling system that can be used to drill a well.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212, a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPS) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use one or more directional drilling techniques, equipment, etc.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the traveling block 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drillstring 225 may be pulled from a wellbore and optionally replaced, for example, with a new or sharpened drill bit, a smaller diameter drillstring, etc. As mentioned, the act of pulling a drillstring out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drillstring 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measurement-while-drilling (MWD) module 256, an optional module 258, a rotary-steerable system (RSS) and/or motor 260, and the drill bit 226. Such components or modules may be referred to as tools where a drillstring can include a plurality of tools.

As to an RSS, it involves technology utilized for directional drilling. Directional drilling involves drilling into the Earth to form a deviated bore such that the trajectory of the bore is not vertical; rather, the trajectory deviates from vertical along one or more portions of the bore. As an example, consider a target that is located at a lateral distance from a surface location where a rig may be stationed. In such an example, drilling can commence with a vertical portion and then deviate from vertical such that the bore is aimed at the target and, eventually, reaches the target. Directional drilling may be implemented where a target may be inaccessible from a vertical location at the surface of the Earth, where material exists in the Earth that may impede drilling or otherwise be detrimental (e.g., consider a salt dome, etc.), where a formation is laterally extensive (e.g., consider a relatively thin yet laterally extensive reservoir), where multiple bores are to be drilled from a single surface bore, where a relief well is desired, etc.

One approach to directional drilling involves a mud motor; however, a mud motor can present some challenges depending on factors such as rate of penetration (ROP), transferring weight to a bit (e.g., weight on bit, WOB) due to friction, etc. A mud motor can be a positive displacement motor (PDM) that operates to drive a bit (e.g., during directional drilling, etc.). A PDM operates as drilling fluid is pumped through it where the PDM converts hydraulic power of the drilling fluid into mechanical power to cause the bit to rotate.

As an example, a PDM may operate in a combined rotating mode where surface equipment is utilized to rotate a bit of a drillstring (e.g., a rotary table, a top drive, etc.) by rotating the entire drillstring and where drilling fluid is utilized to rotate the bit of the drillstring. In such an example, a surface RPM (SRPM) may be determined by use of the surface equipment and a downhole RPM of the mud motor may be determined using various factors related to flow of drilling fluid, mud motor type, etc. As an example, in the combined rotating mode, bit RPM can be determined or estimated as a sum of the SRPM and the mud motor RPM, assuming the SRPM and the mud motor RPM are in the same direction.

As an example, a PDM mud motor can operate in a so-called sliding mode, when the drillstring is not rotated from the surface. In such an example, a bit RPM can be determined or estimated based on the RPM of the mud motor.

An RSS can drill directionally where there is continuous rotation from surface equipment, which can alleviate the sliding of a steerable motor (e.g., a PDM). An RSS may be deployed when drilling directionally (e.g., deviated, horizontal, or extended-reach wells). An RSS can aim to minimize interaction with a borehole wall, which can help to preserve borehole quality. An RSS can aim to exert a relatively consistent side force akin to stabilizers that rotate with the drillstring or orient the bit in the desired direction while continuously rotating at the same number of rotations per minute as the drillstring.

The LWD module 254 may be housed in a suitable type of drill collar and can contain one or a plurality of selected types of logging tools. It will also be understood that more than one LWD and/or MWD module can be employed, for example, as represented at by the MWD module 256 of the drillstring assembly 250. Where the position of an LWD module is mentioned, as an example, it may refer to a module at the position of the LWD module 254, the MWD module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 256 may include equipment for generating electrical power, for example, to power various components of the drillstring 225. As an example, the MWD tool 256 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform method such as geosteering. As mentioned, a steerable system can be or include an RSS. As an example, a steerable system can include a PDM or of a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
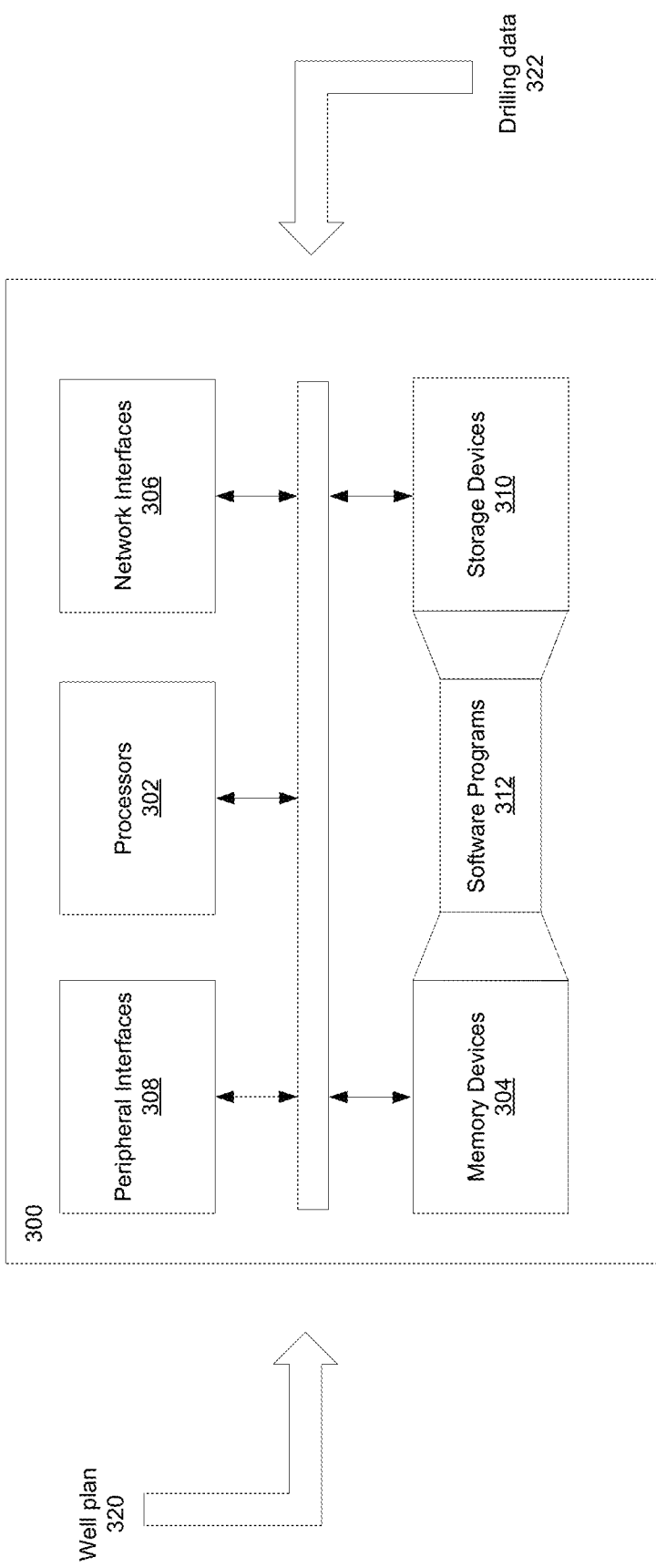
FIG. 3 illustrates an example computing system that may be used in connection with the drilling system.

FIG. 3 illustrates a schematic view of such a computing or processor system 300, according to an embodiment. The processor system 300 may include one or more processors 302 of varying core configurations (including multiple cores) and clock frequencies. The one or more processors 302 may be operable to execute instructions, apply logic, etc. It will be appreciated that these functions may be provided by multiple processors or multiple cores on a single chip operating in parallel and/or communicably linked together. In at least one embodiment, the one or more processors 302 may be or include one or more GPUs.

The processor system 300 may also include a memory system, which may be or include one or more memory devices and/or computer-readable media 304 of varying physical dimensions, accessibility, storage capacities, etc. such as flash drives, hard drives, disks, random access memory, etc., for storing data, such as images, files, and program instructions for execution by the processor 302. In an embodiment, the computer-readable media 304 may store instructions that, when executed by the processor 302, are configured to cause the processor system 300 to perform operations. For example, execution of such instructions may cause the processor system 300 to implement one or more portions and/or embodiments of the method(s) described above.

The processor system 300 may also include one or more network interfaces 306. The network interfaces 306 may include any hardware, applications, and/or other software. Accordingly, the network interfaces 306 may include Ethernet adapters, wireless transceivers, PCI interfaces, and/or serial network components, for communicating over wired or wireless media using protocols, such as Ethernet, wireless Ethernet, etc.

As an example, the processor system 300 may be a mobile device that includes one or more network interfaces for communication of information. For example, a mobile device may include a wireless network interface (e.g., operable via one or more IEEE 802.11 protocols, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

The processor system 300 may further include one or more peripheral interfaces 308, for communication with a display, projector, keyboards, mice, touchpads, sensors, other types of input and/or output peripherals, and/or the like. In some implementations, the components of processor system 300 need not be enclosed within a single enclosure or even located in close proximity to one another, but in other implementations, the components and/or others may be provided in a single enclosure. As an example, a system may be a distributed environment, for example, a so-called "cloud" environment where various devices, components, etc. interact for purposes of data storage, communications, computing, etc. As an example, a method may be implemented in a distributed environment (e.g., wholly or in part as a cloud-based service).

As an example, information may be input from a display (e.g., a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

The memory device 304 may be physically or logically arranged or configured to store data on one or more storage devices 310. The storage device 310 may include one or more file systems or databases in any suitable format. The storage device 310 may also include one or more software programs 312, which may contain interpretable or executable instructions for performing one or more of the disclosed processes. When requested by the processor 302, one or more of the software programs 312, or a portion thereof, may be loaded from the storage devices 310 to the memory devices 304 for execution by the processor 302.

Those skilled in the art will appreciate that the above-described componentry is merely one example of a hardware configuration, as the processor system 300 may include any type of hardware components, including any accompanying firmware or software, for performing the disclosed implementations. The processor system 300 may also be implemented in part or in whole by electronic circuit components or processors, such as application-specific integrated circuits (ASICs) or field-programmable gate arrays (FPGAs).

The processor system 300 may be configured to receive a well plan 320. As discussed above, a well plan is to the description of the proposed wellbore to be used by the drilling team in drilling the well. The well plan typically includes information about the shape, orientation, depth, completion, and evaluation along with information about the equipment to be used, actions to be taken at different points in the well construction process, and other information the team planning the well believes will be relevant/helpful to the team drilling the well. A directional drilling well plan will also include information about how to steer and manage the direction of the well.

The processor system 300 may be configured to receive drilling data 322. The drilling data 322 may include data collected by one or more sensors associated with surface equipment or with downhole equipment. The drilling data 322 may include information such as data relating to the position of the BHA (such as survey data or continuous position data), drilling parameters (such as weight on bit (WOB), rate of penetration (ROP), torque, or others), text information entered by individuals working at the wellsite, or other data collected during the construction of the well.

In one embodiment, the processor system 300 is part of a rig control system (RCS) for the rig. In another embodiment, the processor system 300 is a separately installed computing unit including a display that is installed at the rig site and receives data from the RCS. In such an embodiment, the software on the processor system 300 may be installed on the computing unit, brought to the wellsite, and installed and communicatively connected to the rig control system in preparation for constructing the well or a portion thereof.

In another embodiment, the processor system 300 may be at a location remote from the wellsite and receives the drilling data 322 over a communications medium using a protocol such as well-site information transfer specification or standard (WITS) and markup language (WITSML). In such an embodiment, the software on the processor system 300 may be a web-native application that is accessed by users using a web browser. In such an embodiment, the processor system 300 may be remote from the wellsite where the well is being constructed, and the user may be at the wellsite or at a location remote from the wellsite.

Figure 4:
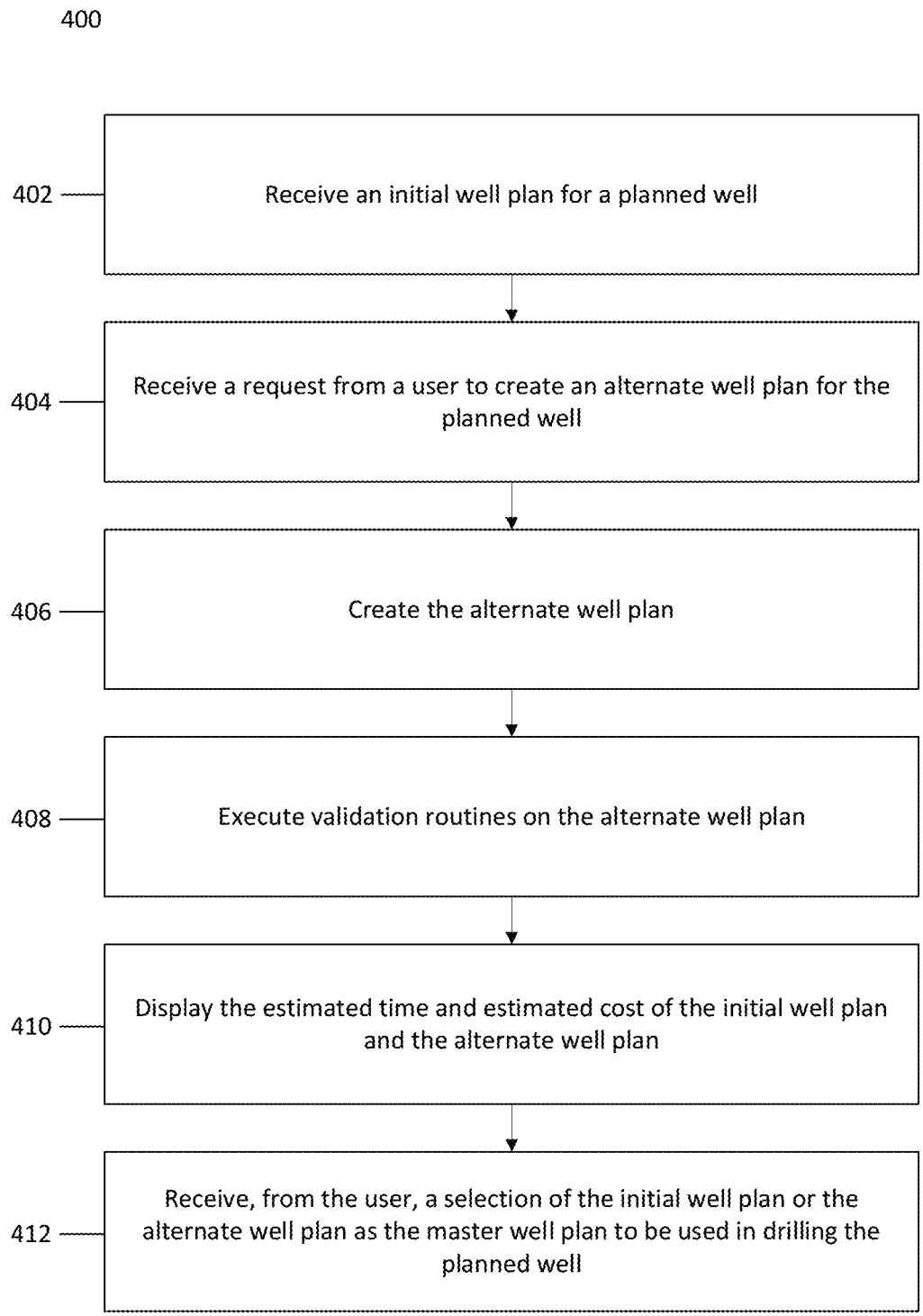
FIG. 4 illustrates an example method for selecting a well plan.

FIG. 4 illustrates an example method 400 for selecting a well plan. In one embodiment, the method 400 begins with receiving 402 an initial well plan for a planned well. The initial well plan may be a first version of a well plan for the planned well created by a team of engineers and specialists who contribute to initial well plan based on their area of expertise. In one embodiment, the initial well plan is a template well plan; a company may have a developed a well plan that is generally appropriate for a particular area that includes certain best practices and requirements of the company. In such an embodiment, providing a template well plan may help the team begin the well planning process that meets company standards more quickly than if they were to start building a plan from the beginning.

The method 400 may also involve receiving 404 a request from a user to create an alternate well plan for the planned well. In one embodiment, a user may want to explore different options for the planned well and use the initial well as a starting point. In another embodiment, as noted above, the user may start with the template well plan and want to create an alternate well plan with the template well plan as the starting point.

The system may create 406 the alternate well plan. In one embodiment, this is done by creating a copy of the initial well plan and then receiving changes to the initial well plan from the persons assigned to the well planning project. For example, the user may create the alternate well plan at which point a number of users may make changes to the copy of the alternate well plan. For example, an engineer may create a different trajectory for the borehole in the alternate well plan. An engineer may create different bottom-hole assemblies (BHA) in the alternate well plan. Other changes to the well plan may be made in the alternate well plan.

The method 400 may also involve executing 408 a number of validation routines on the alternate well plan. These validation routines may determine whether the alternate well plan is achievable with the given constraints. In one embodiment, the validation routines calculate the estimated time to complete the planned well using the alternate well plan. The validation routines may also calculate the estimated cost to complete the planned well using the alternate well plan.

The validation engines may make additional calculations as well. In one embodiment, the validation engines may calculate an emissions footprint for the planned well for the initial well plan and the alternative well plan. The validation engine may also assign a risk profile for the initial well plan and alternative well plan.

The method 400 may also include displaying 410 the estimated time and the estimated cost of both the initial well plan and the alternate well plan to the user and receiving, 412, from the user, a selection of the initial well plan or the alternate well plan to be used as the master well plan in drilling the planned well.

While the above example, discussed one alternate well plan, any number of alternate well plans may be created and considered. As above, the different alternate well plans may be created starting from the same initial well plan (such as a template), or from different well plans. For example, a project may include the template well plan and a first plan built by copying the template well plan and making changes to the copy as described above. A user may then create an additional well plan. The user may choose the template as the starting point for this additional well plan or, alternatively, chose the first plan as the starting point for this additional well plan. The validation routines may be executed for the well plans in the project and the results of the validation displayed for each of the alternate well plans.

In certain embodiments, the alternate well plan the user creates may be a contingency well plan. The team planning the well may anticipate one or more events that may happening during the creation of the well that will require a change in the well plan. The team may create one or more alternative well plans that are to be used if certain identified events occur during while drilling the planned well. The user may select one or more of the alternate well plans and identify the events in response to which the team constructing the planned well will use the contingency well plan in drilling the planned well.

The system may determine the differences between the initial well plan and the alternate well plans. For example, the system may determine that a first plan specifies a particular BHA for use in a specified section, and that a second alternate well plan specifies a different BHA for use in the same specified section. The system may determine that the kick-off point in one well plan is different from that in the alternate well plans. The system may determine these differences and display the differences to the user.

Figure 13:
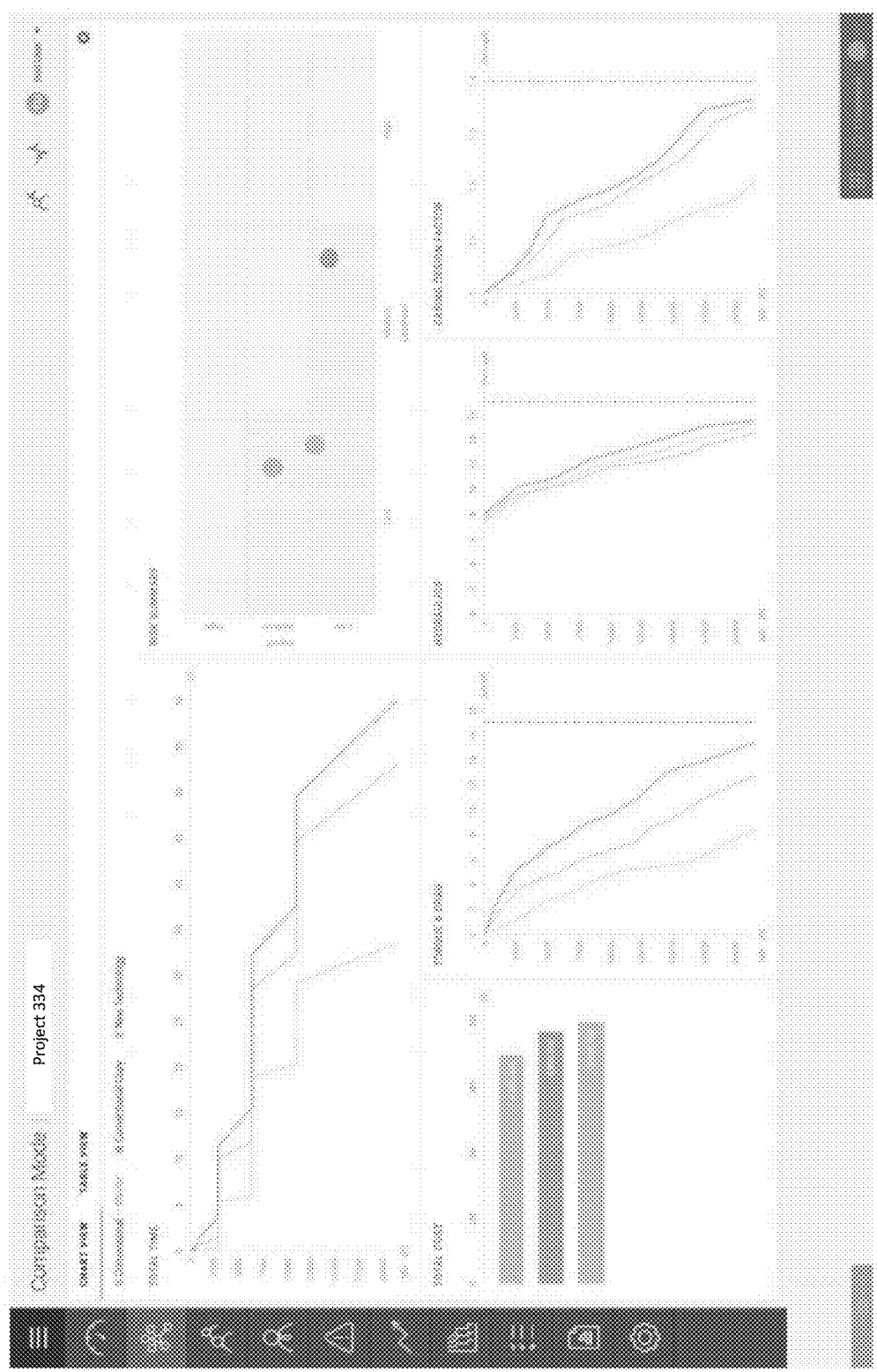
FIG. 13 illustrates an example GUI with a system displaying a comparison of multiple well plans for a project.

FIG. 13 illustrates one embodiment of a comparison display for showing differences between well plans. In the depicted embodiment, three well plans—master, conventional copy, and new technology—are under consideration for a project 334. The comparison mode display illustrates differences between the different well plans. In the displayed embodiment, the comparison mode illustrates differences in time, risk, cost, torque and drag, hydraulics, and casing design factor. Other comparisons may also be provided.

Figure 14:
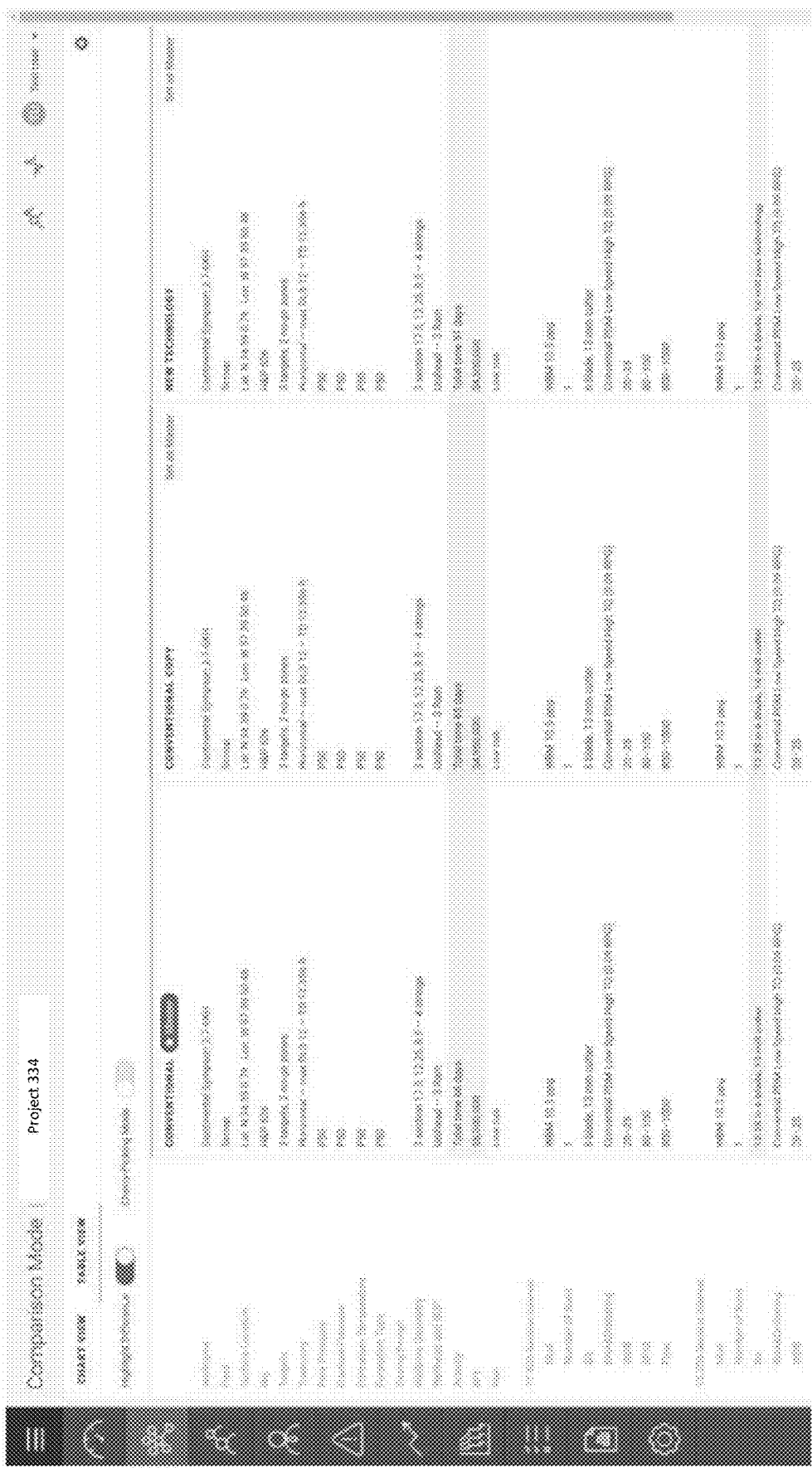
FIG. 14 illustrates a second example GUI with a system displaying a comparison of multiple well plans for a project.

FIG. 14 provides an additional embodiment of a comparison display for showing differences between well plans. In the depicted embodiment, the three well plans—master, conventional copy and new technology—are shown in a tabular format with the differences between the plans highlighted. Other approaches to displaying differences between well plans may also be used.

In one embodiment, the system may store the selected well plan as the master well plan. The system may create a digital version of the well plan for transmission to a drilling system for drilling the planned well and create a written version of the well plan to be printed or delivered electronically to one or more persons involved in drilling the planned well.

The system may store an unmodified version of the master plan and create an editable operational plan from the master well plan. The editable operational plan may be used by the team while the planned well is actually being created by the drilling team. Various circumstances may lead the team to update, or re-plan, certain aspects of the well plan. During operations, the team drilling the well may encounter circumstances that were not anticipated at the planning stage. For example, the formation may not align exactly with what the team anticipated. In response, the team may need to make changes to the well plan that account for this new information received during operations. For example, the team may need to use a different BHA configuration.

In one embodiment, rather than edit the master plan, the team edits an operational plan. The operational plan may be created explicitly and given a different name. In another embodiment, the operational plan is created transparently; in such an embodiment, the system may determine that the master well plan has transmitted to the operational team, that operations on creating the well using the well plan have begun, and treat any additional changes to the master well plan after the commencement of operations as the operational plan.

The system may also be configured to receive, during construction of the planned well, rig sensor data and user-provided information describing activities during construction of the planned well. For example, a system installed on the rig may collect information from components on the rig relating to when particular components (such as the top drive, pumps, or others) are active. Users may input information into the system as part of their reporting on the operations. For example, a user may input information in daily drilling reports. The system may compile rig sensor data and user-provided information describing activities during construction of the planned well as an executed well plan.

In one embodiment, the system associated the selected well plan, the editable operational plan, and the executed well plan to capture the relationship between them; for example, the system may assign a unique identifier for the well and assign that unique identifier to each of the selected well plan, the editable operational plan, and the executed well plan to capture that the plans are all related to the same well. The system may store the selected well plan, the editable operational plan, and the executed well plan in long-term storage.

Figure 5:
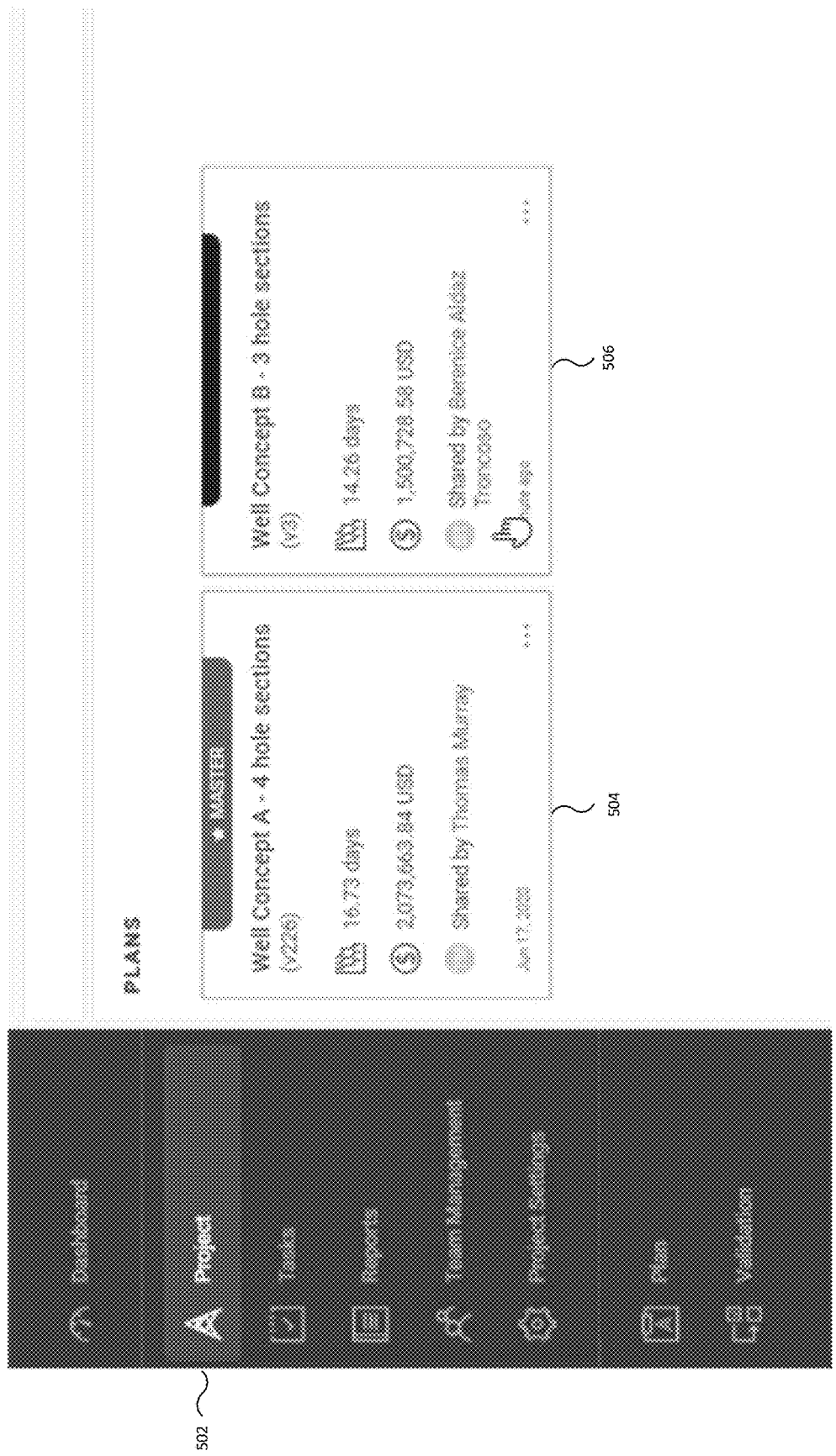
FIG. 5 illustrates an example graphical user interface (GUI) with a project that includes an initial well plan and an alternate well plan for a planned well.

FIG. 5 illustrates an example graphical user interface (GUI) with a project 502 that includes an initial well plan (entitled "Well Concept A—4 hole sections" and identified as 504 in FIG. 5) and an alternate well plan (entitled "Well Concept B—3 hole sections" and identified as 506 in FIG. 5) for a planned well.

In the depicted embodiment, the project 502 currently includes two well plans 504 and 506. As discussed herein, more or fewer well plans may also be included as part of the project 502. In FIG. 5, the well plan 504 is designated the master well plan to be used in drilling the planned well. The well plans 504 and 506 also include additional information displayed in the GUI, including information about who has shared the well plan 504 and 506, the estimated time to complete the planned well (16.73 days for well plan 504 and 14.26 days for well plan 506) and the estimated cost to complete the well plan (2,073,663.84 USD for well plan 504 and 1,500,728.58 USD for well plan 506). The cards displaying information about the respective well plans 504 and 506 in the GUI also include version numbers and a date of the last edit.

Figure 6:
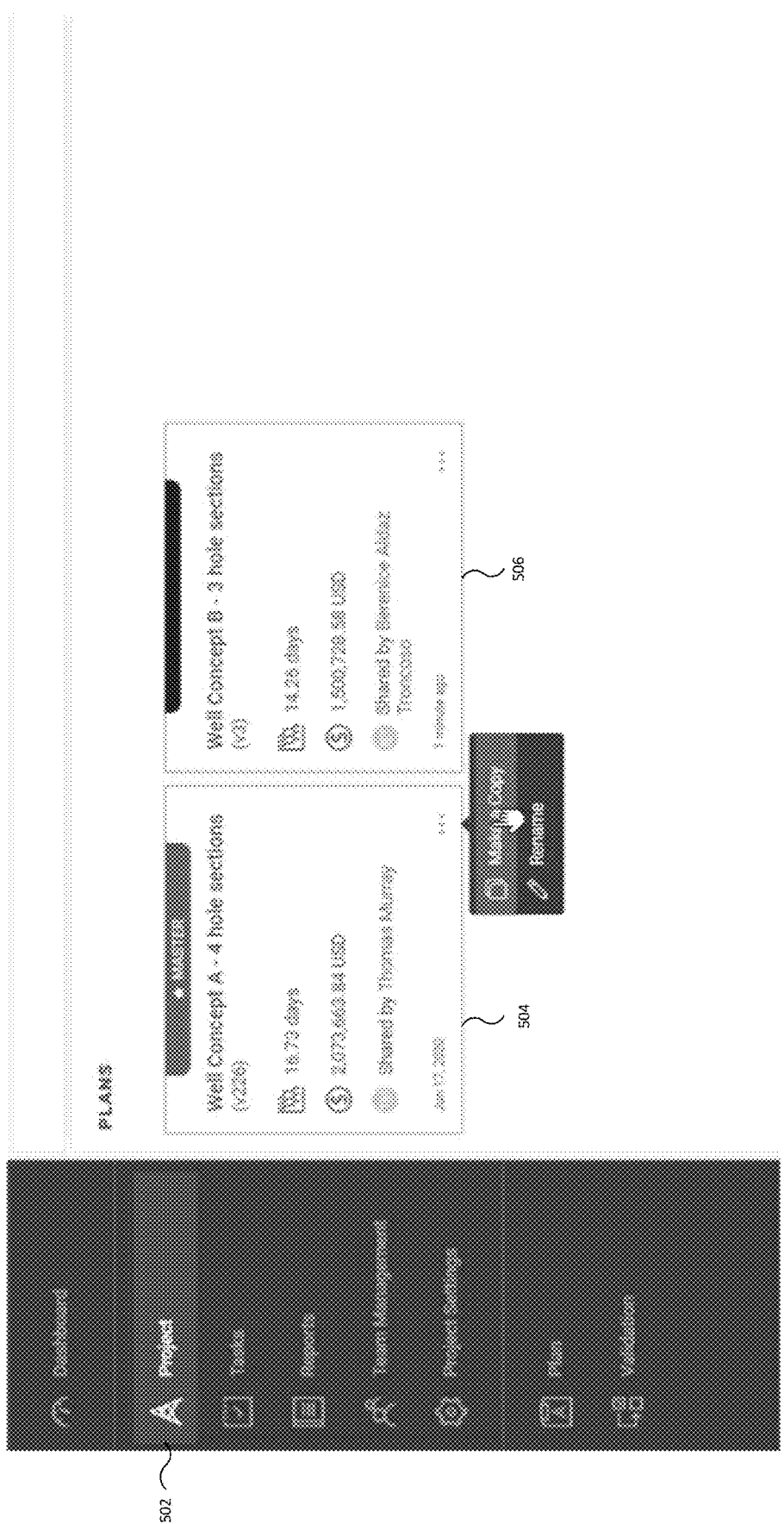
FIG. 6 illustrates an example GUI with a system receiving a request from a user to create an alternate well plan by creating a copy of an initial well plan.

FIG. 6 illustrates an example GUI with a system receiving a request from a user to create an alternate well plan by creating a copy of an initial well plan. In the displayed embodiment, the user may select the three dot icon on the card for well plan 504 to display additional options. In the depicted embodiment, the user is given the option to make a copy of well plan 504 or rename the well plan 504. Other options may also be provided to a user. In response to the user selecting the make a copy option, the system may create a copy of the well plan 504.

Figure 7:
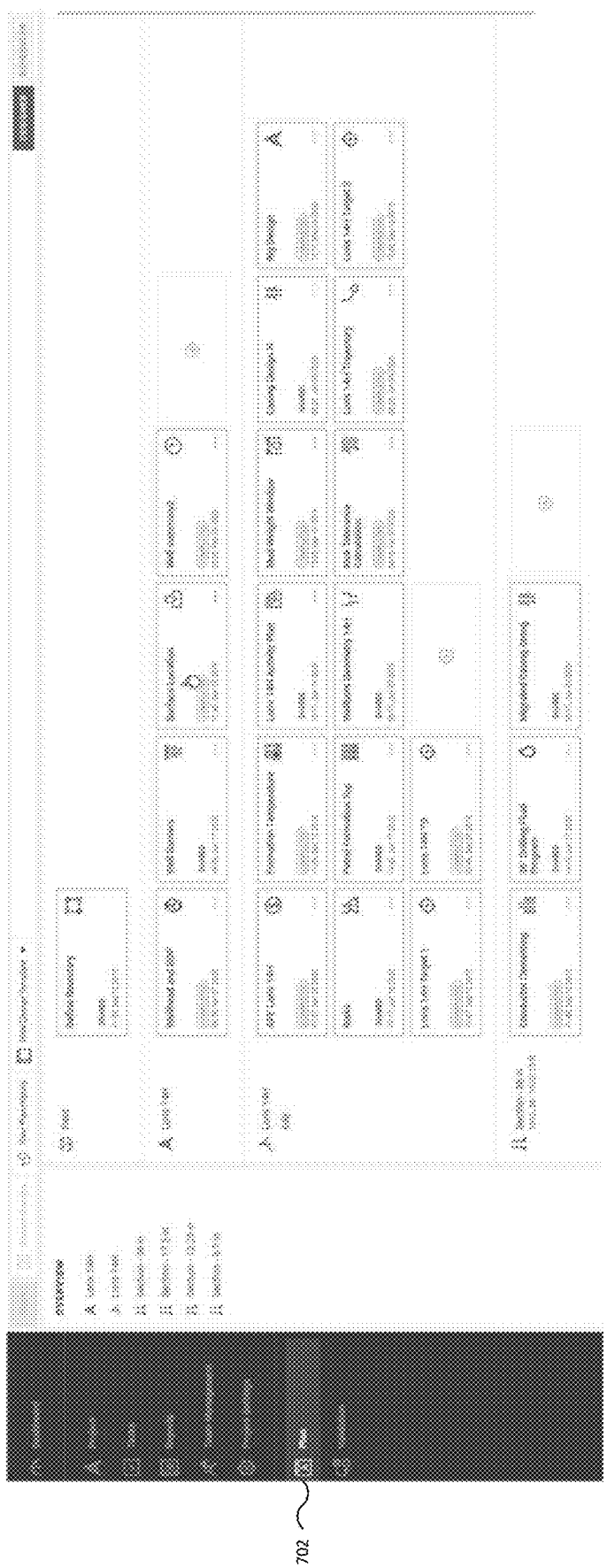
FIG. 7 illustrates an example GUI with a system presenting an editable copy of the alternate well plan to a user.

FIG. 7 illustrates an example GUI with a system presenting an editable copy of an alternate well plan 702 to the user. In the depicted embodiment, the alternate well plan 702 contains actions, objects, and sections of the well plan 504 that the user selected to copy in order to create the alternate well plan 702. In the depicted plan view, the user is presented with more detailed information about aspects of the well plan including information about the field, the wellhead and BOP, the surface location, wellbore geometry, kick tolerance calculation, and other objects and items organized in sections for the alternate well plan 702. Upon creation, the alternate well plan 702 may start as an identical copy of the well plan 504. However, various users responsible for different parts of planning the well and creating a well plan may edit the alternate well plan 702 and create changes. As the changes are received, these changes are captured as part of the alternate well plan 702.

In one embodiment, the alternate well plan 702 copies the objects and activities specified in the well plan 504. The copy operation may also copy all approvals and reviews from the well plan 504. For example, if a particular action was previously reviewed and approved, the approval (including information on the time, date, and identify of the approver) may be carried over to the alternate well plan 702. If a particular activity is under review but not approved, the under review status may carry over to the alternate well plan 702 as well.

Figure 8:
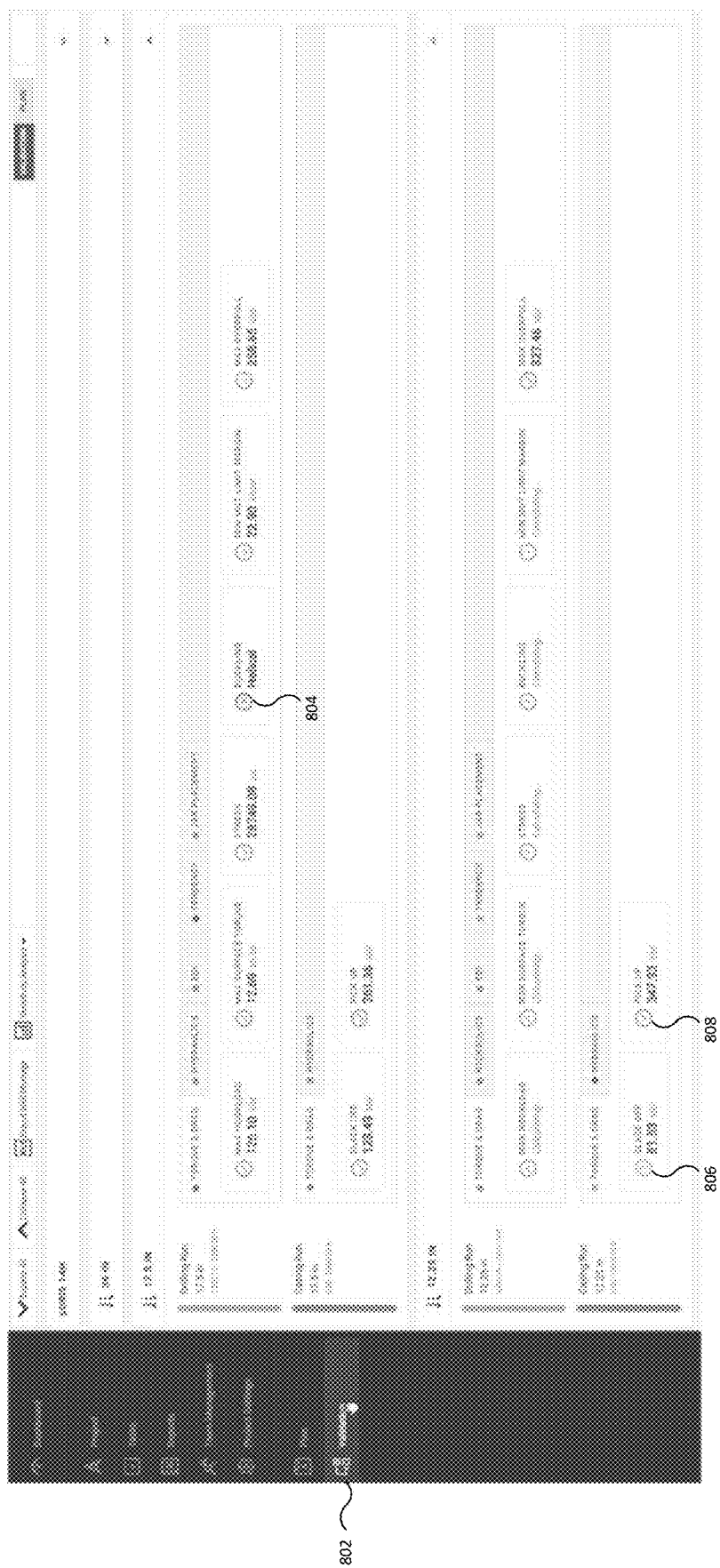
FIG. 8 illustrates an example GUI with a system presenting results of validating the alternate well plan to a user.

FIG. 8 illustrates an example GUI with a system presenting results of validating the alternate well plan 702 to a user. At various points in the modification of the alternate well plan 702, one or more users may review the results of validation routines. A validation panel 802 may display the results of various validation routines for the alternate well plan 702. In one embodiment, the validation routines are executed automatically on the alternate well plan 702 on a regular schedule, in response to changes to the alternate well plan 702, or in response to a user requesting that one or more of the validation routines be executed. In the displayed embodiment, as the validation routines run, various aspects of the alternate well plan 702 are checked. For example, as displayed in FIG. 8, the validation routines may provide results for torque and drag and pick up calculations associated with the casing run. The validation routines may provide information such as the max hookload, the max surface torque, and other parameters calculated by the validation routines.

If particular aspects of the alternate well plan 702 are outside of an approved range, the validation routines may indicate such with an indicator. In FIG. 8, an indicator 804 is used to show an aspect of the alternate well plan 702 that has failed the associated validation routine. An indicator 806 is used to indicate that a particular aspect of the alternate well plan 702 requires caution and may require further review. An indicator 808 is used to indicate that the particular aspect has passed the validation routine.

Figure 9:
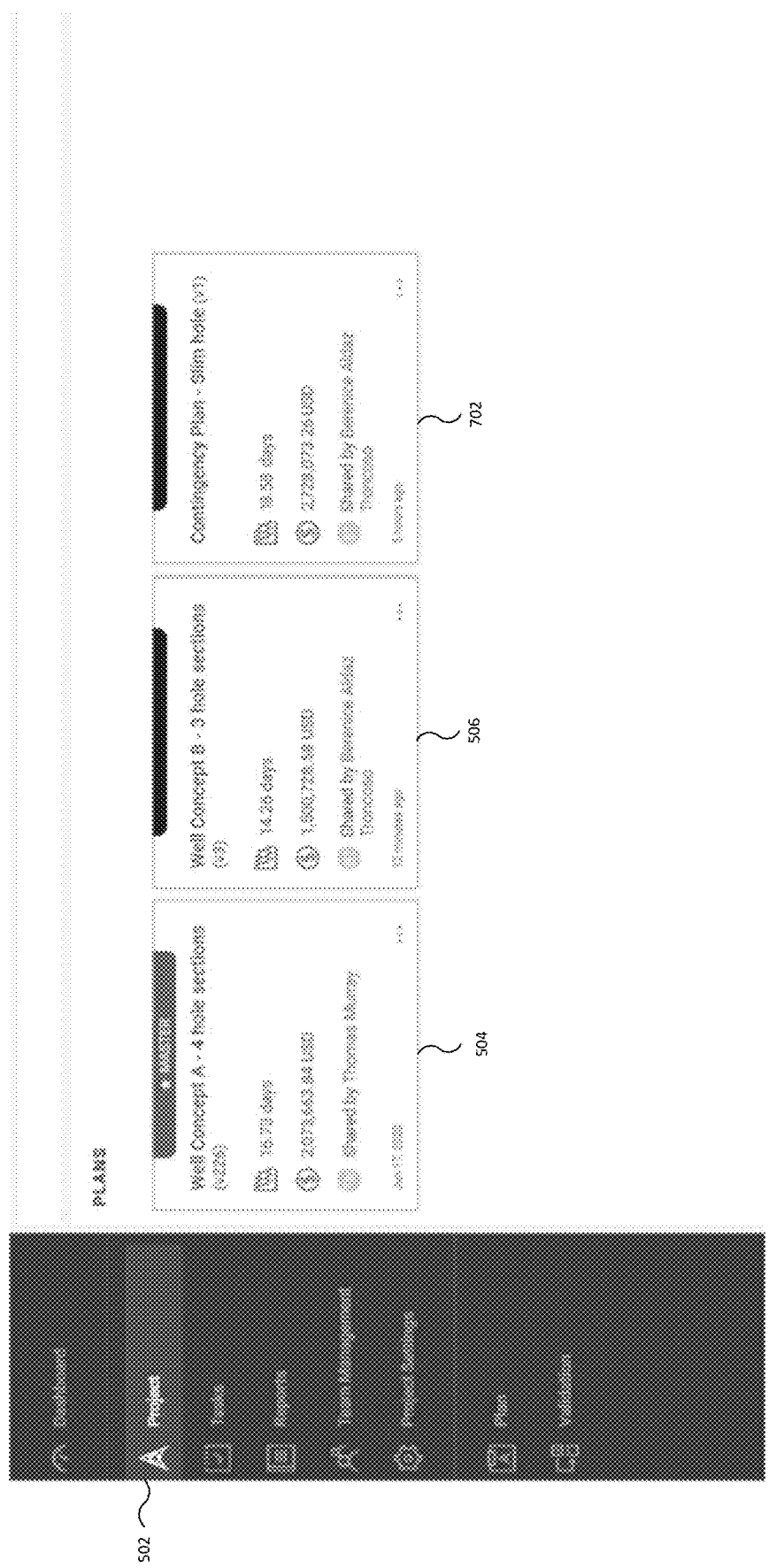
FIG. 9 illustrates an example GUI with a system displaying estimated time and estimated cost of an initial well plan and the alternate well plans.

FIG. 9 illustrates an example GUI with a system displaying estimated time and estimated cost of an initial well plan and the alternate well plans. In FIG. 9, the project 502 includes the initial well plan 504, the alternate well plan 506, and the additional alternate well plan 702. In the illustrated example the additional alternate well plan 702 is a contingency well plan entitled "Contingency Plan—Slim hole." As described above, in certain embodiments, the users may create one or more alternate well plans that are contingency well plans in the project 502. In one embodiment, the user also provides an identification of one or more events in response to which the team constructing the planned well during operations will use the contingency well plan in drilling the planned well.

FIG. 9 illustrates an embodiment where each well plan includes an estimated time to complete the planned well and an estimated cost for the planned well using the respective well plans. While the illustrated embodiment shows the time reported in days, and the cost reported in US dollars, other units may also be used. In one embodiment, the estimated time and cost are provided as a stand-alone number. In other embodiments, the time and cost may be reported relative to the master well plan (in FIG. 9, initial well plan 504). For example, the alternate well plan 506 may report the estimated time as "−2.47" to indicate that the estimated time for alternate well plan 506 is 2.47 days shorter than the estimated time for initial well plan 504. A similar approach may be taken to reporting the estimated cost. In certain embodiments, the stand-alone and relative values are reported.

While FIG. 9 illustrates estimated time and cost, other values may be estimated by validation routines and reported. In one embodiment, a metric representing the risk level associated with the different well plans is provided. The risk level may be, in one embodiment, on a set range such as 1 (low risk) to 10 (high risk). In one embodiment, the risk level is calculated automatically by one or more validation routines. In another embodiment, the risk level may be set by a user.

In another embodiment, a metric representing the emissions footprint for the well is presented. In such an embodiment, a validation routine may calculate an estimate of the carbon emissions generated by equipment and operations associated with the specified well plan. The estimate of the emissions footprint for each of the well plans may then be displayed for the user.

In certain embodiments, the system may display differences between the well plans to the user. Such an embodiment may provide a screen that provides a summary of differences between the well plans. For example, in one embodiment, a screen may display differences in sections in the different plans. Returning to FIG. 8, for sections in common between all plans, the differences within the sections may be illustrated. For example, in one embodiment, the different well plans may each have a 17.5 inch section with a drilling run and a casing run and a 12.25 inch section with a drilling run and a casing run. In such an embodiment, the drilling run may show the values of max hookload, stress, and others for each of the well plans (or a subset selected by the users). In one embodiment, only those values with differences are shown; in such an embodiment, if a particular value (such as bucking) is the same or within a threshold amount then such values are not displayed in the comparison.

Figure 10:
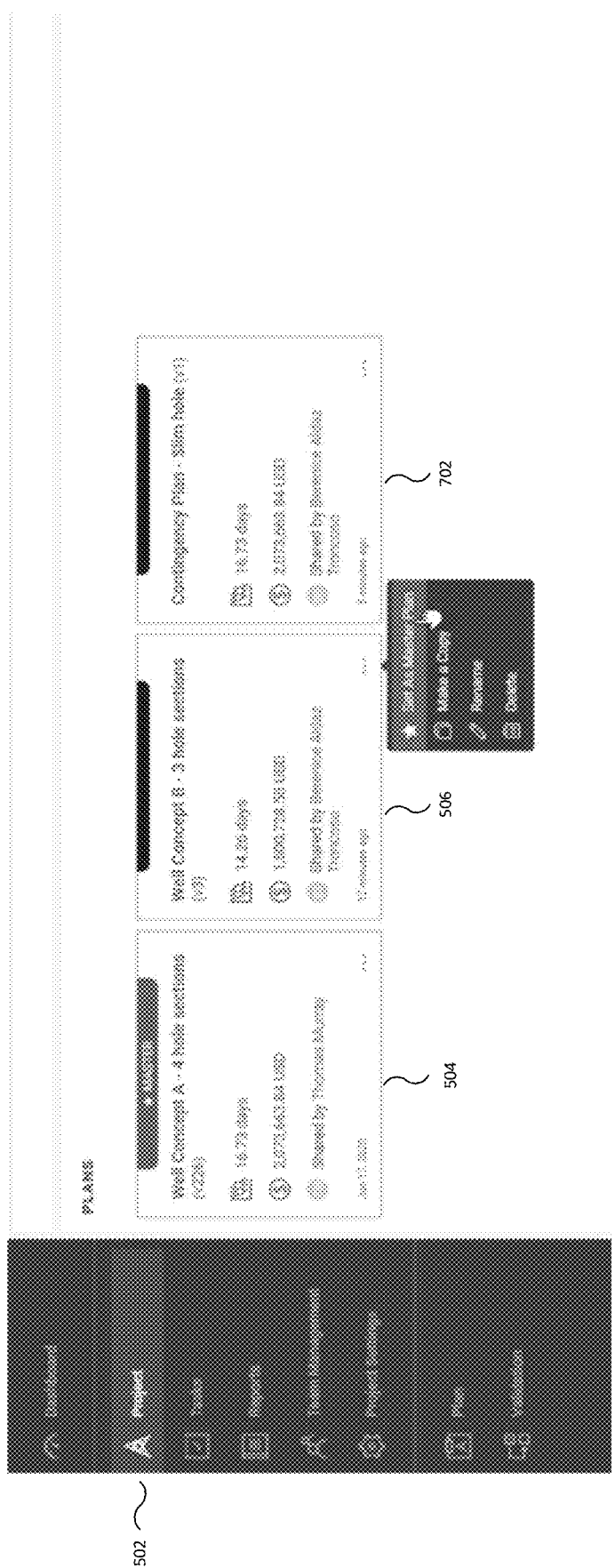
FIG. 10 illustrates an example GUI with a system allowing the user to select one of the plans as the master plan to be used in drilling the planned well.

FIG. 10 illustrates an example GUI with a system allowing the user to select one of the plans as the master plan to be used in drilling the planned well. In the depicted embodiment, the user may decide to use the alternate well plan 506. As such, the user may select the alternate well plan 506 and designate it as the master well plan to be used in drilling the planned well. In one embodiment, a digital drilling program is generated from the well plan designated as the master plan. The digital drilling program is an electronic and machine-readable version of the well plan which can be consumed and parsed by an operational computing system on the drilling rig.

Figure 11:
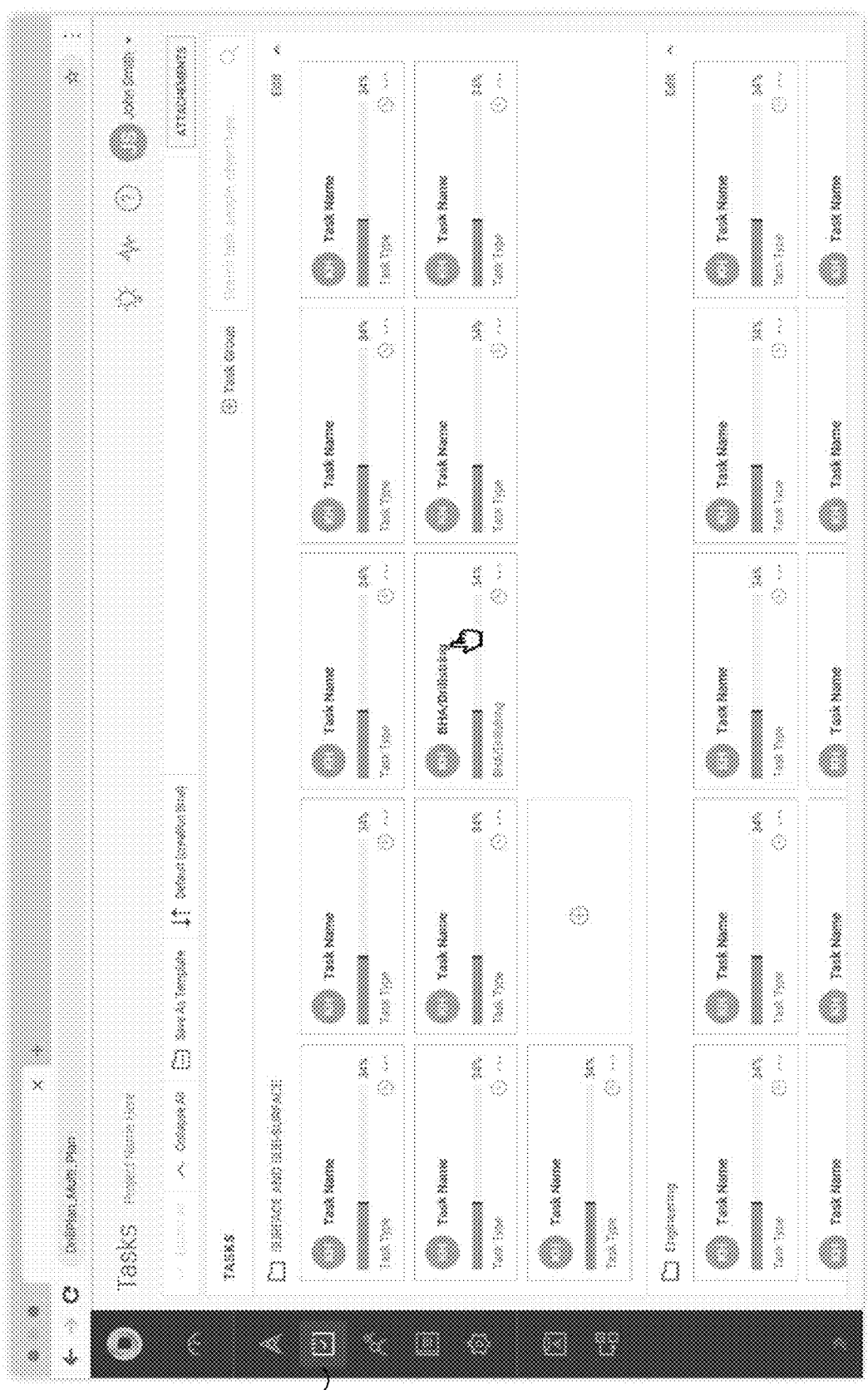
FIG. 11 illustrates an example GUI with a system displaying a task view for a well plan.
Figure 12:
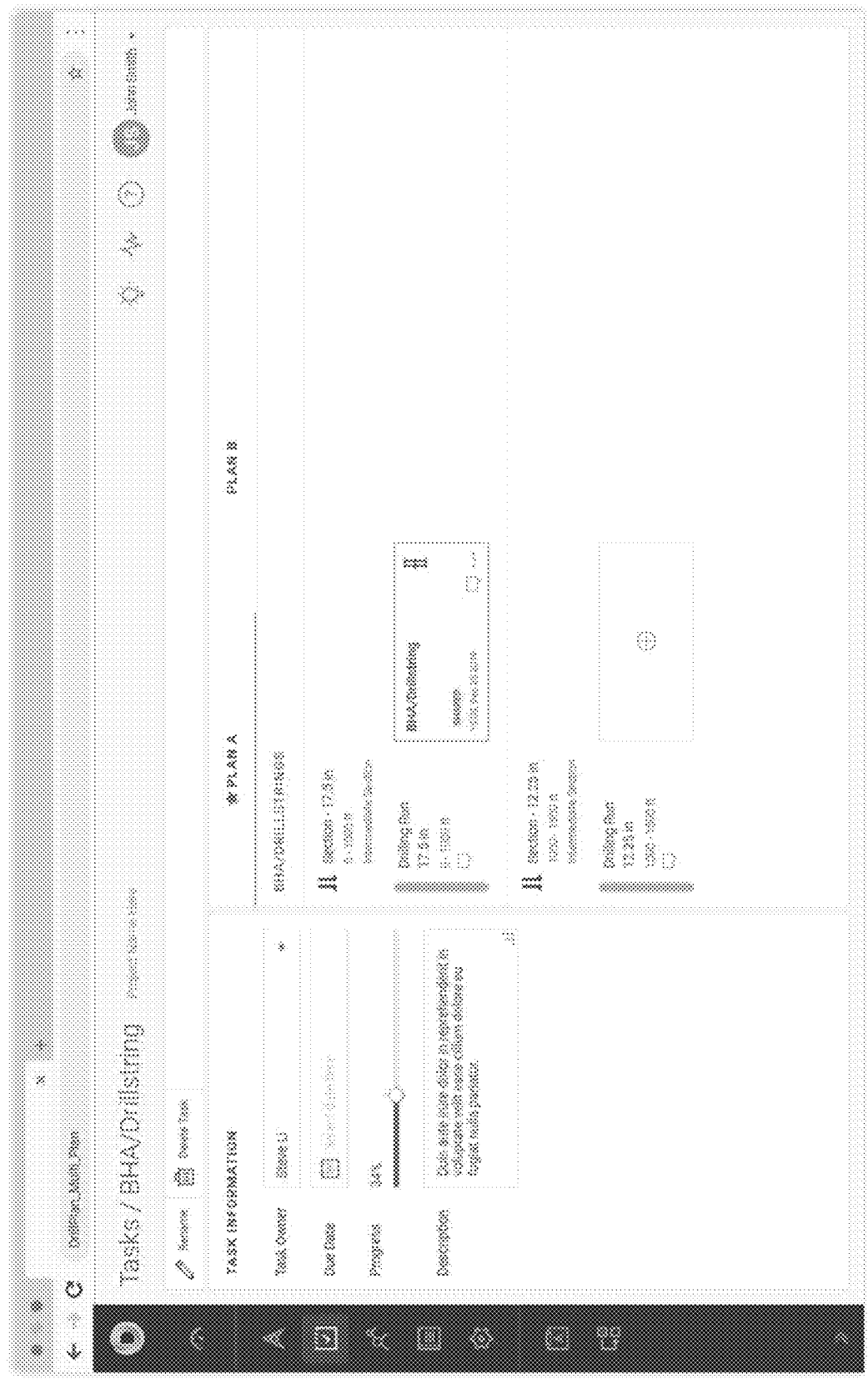
FIG. 12 illustrates an example GUI with a system displaying an object view with information for multiple well plans in a project.

In one embodiment, a user may have access to a task view 1102. The task view may show tasks assigned to a particular user across one or more different projects. The user may select a task (such as one of the tasks in the Surface and Sub-Surface group shown in FIG. 11) and be taken to a view such as the one shown in FIG. 12. As seen in FIG. 12, if the task is open for the user in multiple plans within the project, the user may be shown different tabs for the well plans that have this task (such as Plan A and Plan B in FIG. 12). In such an embodiment, the user may take different activities for the same task in the different plans. As seen in FIG. 12, the user may choose to create one candidate BHA/Drillstring for Plan A, and a separate, difference candidate BHA/Drillstring for Plan B.

In one embodiment, once the drilling operation has commenced using the well plan, an editable operational plan is created. In one embodiment, the editable operational plan is listed as a separate plan within the project. In another embodiment, the system may show the user the designated master well plan and allow the user to make changes to the designated master well plan after the operations commence. In one embodiment, any changes to the master well plan made after the operations commence are treated by the system as a new, editable operational plan and the designated master well plan, as originally approved for the commencement of the drilling operation for the planned well, is stored.

During operations, a system at the rig may collect data relating to the operations. One source of data may be sensors and equipment on the rig. For example, certain devices may be configured to generate data related to their operation and transmit the data according to a specified protocol, such as WITS. Software may be deployed at the rig to capture input from personnel involved in drilling the planned well. For example, one or more personnel at the rig may complete reports to capture information related the operation. These may be, for example, daily drilling reports or others. In certain embodiments, the reports may be filed out in hard copy and later digitized.

The system may be configured to collect the data relating to the operations and compile the data as an executed well plan. The executed well plan, as used herein, refers to a collection of data (some of which may be manually entered and some of which may be automatically gathered) that represents the actual activity that occurred while drilling the well. As noted above, the operational teams may take actions that differ from those specified in the master well plan. The executed well plan is a representation of the activity that actually occurred while drilling the planned well. The system may be configured to store the master well plan, the editable operational plan, and the executed well plan and to associate them with the same well.

Figure 15:
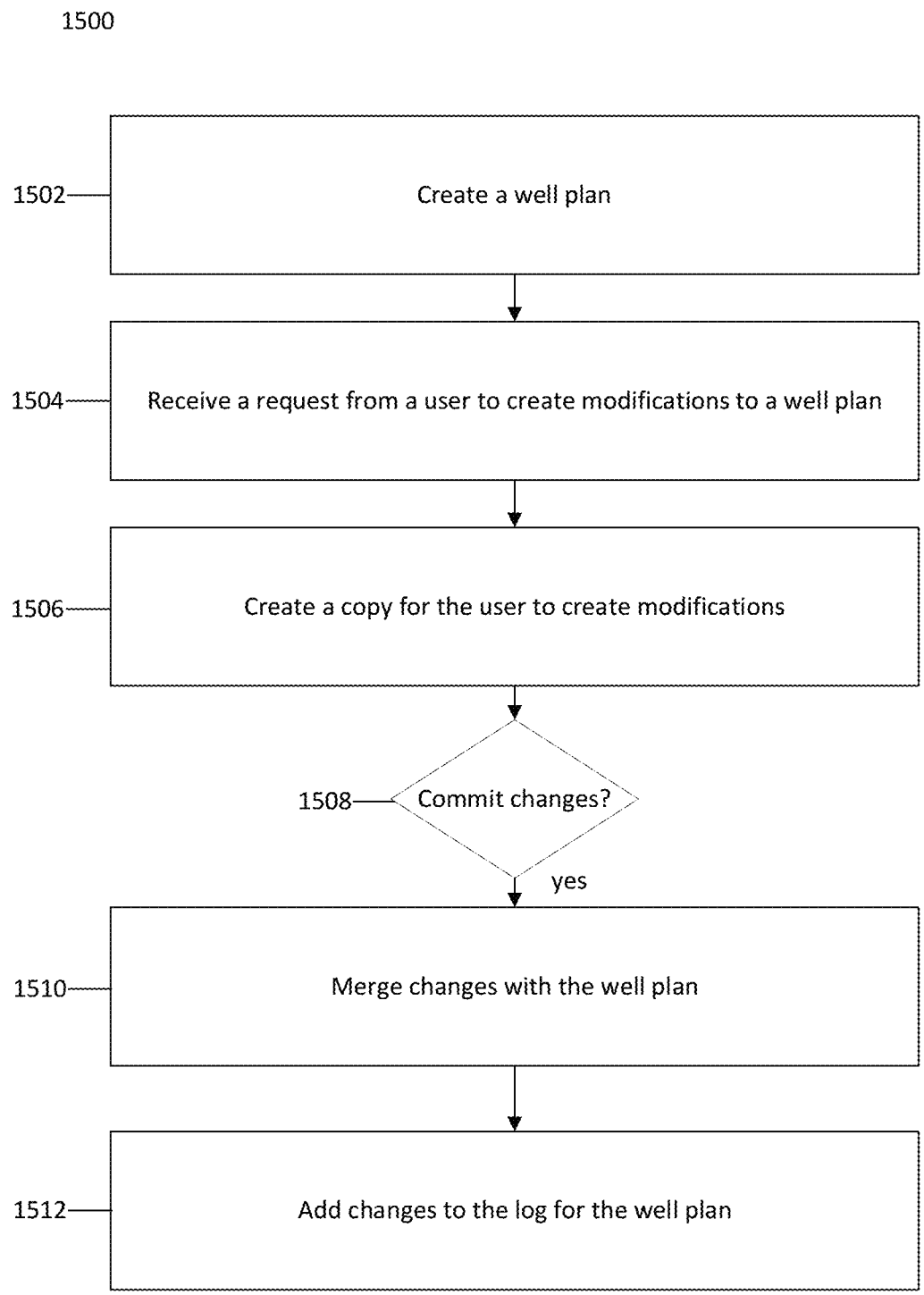
FIG. 15 illustrates an example method for logging and tracking changes to a well plan.

FIG. 15 illustrates one embodiment of a method 1500 for managing edits to a well plan. In one embodiment, the method begins with creating 1502 the well plan. As discussed above, the well plan may be created from an empty template, a pre-populated template, or using a copy of another well plan. A user may want to make changes to the well plan. In such an instance, the method may involve receiving 1504 a request from the user to create modifications to the well plan and creating 1506 a copy of the well plan for the user to create the modifications.

In such an embodiment, the system may provide a local instance of the well plan and a shared instance of the well plan. Contributors working on the planning phase may have access to the shared instance of the well plan. When a particular contributor wants to make a change to the shared instance (such as an edit, addition, deletion, or other change), the system may create a local copy for the user. This local copy may be on the contributor's local machine. The local copy may also be in the same computing infrastructure used by the planning software, but stored separately from the shared instance of the well plan.

In the local copy, the user may draft or investigate potential changes to the well plan. The user may run one or more validation engines on the draft copy to determine the impact of the changes on the shared instance of the well plan. The user may determine that they want to publish the draft changes on the local instance to the shared instance of the well plan. In such an embodiment, the user may commit 1508 the changes, in response to which the method may involve merging 1510 the changes with the well plan and adding 1512 the changes to a log for the well plan.

In certain embodiments, the changes may need to be reviewed and approved by one or more individuals prior to merging the changes with the well plan. The changes may be required to pass one or more validation routines. In one embodiment, if the changes satisfy one or more validation routines, the changes may be committed without further review. If the changes fail to satisfy one or more validation routines, the changes may be committed after review by an individual with appropriate oversight authority.

Figure 16:
FIG. 16 illustrates an example GUI providing a dialogue window to commit changes to a well plan.

FIG. 16 illustrates one embodiment of a dialog that provides a user with a summary of changes to be made to the well plan as part of the update. The user may further provide comments for the change. In one embodiment, once the changes are shared and accepted, the changes and comments become part of a log of actions for the well plan.

In one embodiment, the approach involves creating a log of changes committed to the well plan by contributing authors to the well plan. The approach may also involve creating a new version number for the well plan in response to accepting the changes committed to the well plan.

In certain embodiments, the approach involves creating a log of changes to objects as well as a log for the well plan. As seen in FIG. 16, objects may include a wellbore, a surface location, a BHA, a bit, a section, or other. Objects may also include sets of activities such as a mud program. In such an embodiment, the approach may provide versioning for the one or more objects in the well plan in addition to the well plan. In response to a user committing changes to the well plan, the logs of changes for the objects impacted by the change are also updated with information about the nature of the change, any comments, time and date, and user information. The object logs may further include entries for reviews, approvals, and changes in state (for example, a change from 'draft' to 'under review' to 'approved').

Conclusion

The embodiments disclosed in this disclosure are to help explain the concepts described herein. This description is not exhaustive and does not limit the claims to the precise embodiments disclosed. Modifications and variations from the exact embodiments in this disclosure may still be within the scope of the claims.

Likewise, the steps described need not be performed in the same sequence discussed or with the same degree of separation. Various steps may be omitted, repeated, combined, or divided, as appropriate. Accordingly, the present disclosure is not limited to the above-described embodiments, but instead is defined by the appended claims in light of their full scope of equivalents. In the above description and in the below claims, unless specified otherwise, the term "execute" and its variants are to be interpreted as pertaining to any operation of program code or instructions on a device, whether compiled, interpreted, or run using other techniques.

Certain of the claims below may include numbered lists. The numbers are provided as an organizational tool to aid in readability. The numbers themselves do not indicate an expected order of configuration or execution or otherwise have substantive meaning. For United States applications, the claims that follow do not invoke section 112(f) unless the phrase "means for" is expressly used together with an associated function.

What is claimed is:

1. A computer-implemented method comprising:
    receiving an initial well plan for a planned well;
    receiving a request from a user to create an alternate well plan for the planned well;
    creating the alternate well plan by:
        in response to the request, creating a copy of the initial well plan; and
        receiving a plurality of changes to the alternate well plan;
    executing a plurality of validation routines on the alternate well plan, wherein the plurality of validation routines determines a risk level of whether the plurality of changes to the alternate well plan are achievable based on whether individual aspects of a plurality of aspects of the alternate well plan are outside of an approved range, and wherein the plurality of validation routines automatically calculates at least:
        an estimated time to complete the planned well using the alternate well plan;
        an estimated cost to complete the planned well using the alternate well plan; and
        an emissions footprint for the planned well using the alternate well plan;
    displaying the estimated time and the estimated cost of the initial well plan and one or more alternate well plans including the alternate well plan;
    receiving, from the user:
        a selection of one of the initial well plan and the alternate well plan as a master well plan to be used in drilling the planned well;
        a selection of one of the one or more alternate well plans as a contingency well plan; and
        an identification of one or more events in response to which a team constructing the planned well will use the contingency well plan in drilling the planned well;
    based on the selection, generating an operational plan including a series of instructions executable by drilling equipment to drill the planned well; and
    providing the operation plan to the drilling equipment, wherein, upon providing the operational plan to the drilling equipment, the drilling equipment executes the operational plan in accordance with the instructions in the operational plan.

2. The computer-implemented method of claim 1, further comprising:
    creating a plurality of alternate well plans including the one or more alternate well plans; and
    displaying the estimated time and the estimated cost for each of the plurality of alternate well plans, wherein receiving, from the user, the selection of one of the initial well plan and the alternate well plan as the master well plan to be used in drilling the planned well comprises receiving, from the user, a selection of one of the plurality of alternate well plans.

3. The computer-implemented method of claim 1, further comprising:
    determining a plurality of differences between the initial well plan and the alternate well plan; and
    displaying the plurality of differences to the user.

4. The computer-implemented method of claim 1, further comprising:
    storing the selected well plan as the master well plan, wherein the operational plan is an editable operational plan editable while drilling the planned well.

5. The computer-implemented method of claim 4, further comprising:
    receiving, during construction of the planned well, rig sensor data and user-provided information describing activities during construction of the planned well as an executed well plan;
    associating the selected well plan, the editable operational plan, and the executed well plan; and
    storing the selected well plan, the editable operational plan, and the executed well plan.

6. The computer-implemented method of claim 1, further comprising, during creation of the initial well plan for the planned well, creating a log of changes committed to the initial well plan by contributing authors to the initial well plan.

7. The computer-implemented method of claim 6, further comprising, for one or more objects in the initial well plan, creating a log of changes to the one or more objects by multiple contributing authors, wherein the one or more objects comprise one or more of:
    a wellbore;
    a mud program; and
    a bottom hole assembly.

8. The computer-implemented method of claim 1, wherein the plurality of validation routines further calculates a risk profile for the planned well using the alternate well plan.

9. A non-transitory computer-readable storage medium, the computer-readable storage medium including instructions that when executed by a computer, cause the computer to:
    receive an initial well plan for a planned well;

receive a request from a user to create an alternate well plan for the planned well;
create the alternate well plan by:
in response to the request, creating a copy of the initial well plan; and
receiving a plurality of changes to the alternate well plan;
execute a plurality of validation routines on the alternate well plan, wherein the plurality of validation routines determines a risk level of whether the plurality of changes to the alternate well plan are achievable based on whether individual aspects of a plurality of aspects of the alternate well plan are outside of an approved range, and wherein the plurality of validation routines automatically calculates at least:
an estimated time to complete the planned well use the alternate well plan;
an estimated cost to complete the planned well use the alternate well plan; and
an emissions footprint for the planned well using the alternate well plan;
display the estimated time and the estimated cost of the initial well plan and the alternate well plan;
receive, from the user:
a selection of one of the initial well plan and the alternate well plan as a master well plan to be used in drilling the planned well;
a selection of one of one or more alternate well plans as a contingency well plan; and
an identification of one or more events in response to which a team constructing the planned well will use the contingency well plan in drilling the planned well;
based on the selection, generate an operational plan including a series of instructions executable by drilling equipment to drill the planned well; and
provide the operation plan to the drilling equipment, wherein, upon providing the operational plan to the drilling equipment, the drilling equipment executes the operational plan in accordance with the instructions in the operational plan.

10. The computer-readable storage medium of claim 9, wherein the instructions further configure the computer to:
create a plurality of alternate well plans including the one or more alternate well plans; and
display the estimated time and the estimated cost for each of the plurality of alternate well plans, wherein receiving, from the user, the selection of one of the initial well plan and the of alternate well plan as the master well plan to be used in drilling the planned well comprises receiving, from the user, a selection of one of the plurality of alternate well plans.

11. The computer-readable storage medium of claim 9, wherein the instructions further configure the computer to:
determine a plurality of differences between the initial well plan and the alternate well plan; and
display the plurality of differences to the user.

12. The computer-readable storage medium of claim 9, wherein the instructions further configure the computer to, during creation of the initial well plan for the planned well, create a log of changes committed to the initial well plan by contributing authors to the initial well plan.

13. The computer-readable storage medium of claim 9, wherein the plurality of validation routines further calculates or more of:
a risk profile for the planned well use the alternate well plan.

14. A computing apparatus comprising:
a processor; and
a memory storing instructions that, when executed by the processor, configure the apparatus to:
receive an initial well plan for a planned well;
receive a request from a user to create an alternate well plan for the planned well;
create the alternate well plan by:
in response to the request, creating a copy of the initial well plan; and
receiving a plurality of changes to the alternate well plan;
execute a plurality of validation routines on the alternate well plan, wherein the plurality of validation routines determines a risk level of whether the plurality of changes to the alternate well plan are achievable based on whether individual aspects of a plurality of aspects of the alternate well plan are outside of an approved range, and wherein the plurality of validation routines automatically calculates at least:
an estimated time to complete the planned well use the alternate well plan;
an estimated cost to complete the planned well use the alternate well plan; and
an emissions footprint for the planned well using the alternate well plan;
display the estimated time and the estimated cost of the initial well plan and the alternate well plan;
receive, from the user:
a selection of one of the initial well plan and the alternate well plan as a master well plan to be used in drilling the planned well;
a selection of one of one or more alternate well plans as a contingency well plan; and
an identification of one or more events in response to which a team constructing the planned well will use the contingency well plan in drilling the planned well;
based on the selection, generate an operational plan including a series of instructions executable by drilling equipment to drill the planned well; and
provide the operation plan to the drilling equipment, wherein, upon providing the operational plan to the drilling equipment, the drilling equipment executes the operational plan in accordance with the instructions in the operational plan.

15. The computing apparatus of claim 14, wherein the instructions further configure the apparatus to:
create a plurality of alternate well plans including the one or more alternate well plans; and
display the estimated time and the estimated cost for each of the plurality of alternate well plans, wherein receiving, from the user, the selection of one of the initial well plan and the alternate well plan as the master well plan to be used in drilling the planned well comprises receiving, from the user, a selection of one of the plurality of alternate well plans.

16. The computing apparatus of claim 14, wherein the instructions further configure the apparatus to:
determine a plurality of differences between the initial well plan and the alternate well plan; and
display the plurality of differences to the user.

17. The computing apparatus of claim 14, wherein the plurality of validation routines further calculates a risk profile for the planned well use the alternate well plan.

* * * * *